F. E. ROGERS.
SPEED CHANGING MECHANISM.
APPLICATION FILED MAY 4, 1918.

1,410,722.

Patented Mar. 28, 1922.
6 SHEETS—SHEET 5.

Witnesses:
Dorothy Miatt
Isaac W. Jacobson

Inventor:
Fred E. Rogers,
By his Attorney
Leo. W. Miatt

UNITED STATES PATENT OFFICE.

FRED E. ROGERS, OF EAST ORANGE, NEW JERSEY.

SPEED-CHANGING MECHANISM.

1,410,722.  Specification of Letters Patent.  Patented Mar. 28, 1922.

Application filed May 4, 1918. Serial No. 232,596.

*To all whom it may concern:*

Be it known that I, FRED E. ROGERS, a citizen of the United States, and a resident of East Orange, in the county of Essex and State of New Jersey, have invented certain new and useful Improvements in Speed-Changing Mechanism, of which the following is a specification.

My invention relates to means for transmitting power at various speeds, and is applicable to numerous purposes and uses. My object is to provide a simple but adequate and effective device whereby a constant speed drive may be changed to a higher or a lower velocity ratio in order to meet the varying requirements of work to be done by the driven mechanism. While, as intimated, the scope and utility of the invention is practically unlimited, the mechanical expedients are essentially the same in all cases, consisting, in the simplest construction and arrangement of parts, of a driving element and a driven element, a series of interposed peripheral transmitting rollers axially inclined as related to the axis of either the driving or driven element, or to the axes of both, together with means for changing the axial inclination of said transmitting rollers as related to their peripheral contact with one or both of the other elements, as hereinafter more fully set forth.

In the accompanying drawings.

In the first five figures of the accompanying drawings, I show, by way of exemplification, a practical embodiment of the essential features of my invention in a device for transmitting power at different speeds, although I do not limit myself thereto, nor to any specific construction and arrangement of minor parts, since it is obvious that various modifications may be resorted to in adapting my invention to requirements and exigencies of use without departing from the spirit and intent thereof,—the gist of the invention consisting in the use of the axially inclined transmitting rollers for the purpose of increasing or diminishing the speed of the power transmitted from the driving element to the driven element, or for reversal of direction of motion, substantially as herein set forth.

With this understanding, it may be stated that in the construction and arrangement of parts shown in the first three figures of the drawings either of the pulleys $a$, or $b$, (or their equivalents in the form of gears) may be used as the driving or driven element, as may be found most expedient. The pulley $a$, is rigidly attached to the power shaft $p$, mounted in the bearing $m$, constituting the upper part of the column $m'$, which is integral with the base or bed $m^2$, of the frame. The other or inner end of the power shaft $p$, has rigidly mounted upon it a wheel $c$, on which are peripherally mounted a series of rollers $c'$; and by the term "pitch rollers" I herein mean to designate rollers the axes of which are inclined as related to the axis of the carrier wheel or element on which they are mounted. Thus the trunnions $c^2$, of the pitch rollers $c'$, are journalled in bearings $c^3$, (see Fig. 4) the axes $c^x$, of which are inclined at an angle of thirty degrees as related to the axis of the carrier wheel $c$, which latter axis is coincident with the longitudinal axis $p^x$, of the power shaft $p$. Of course this angle of thirty degrees is not arbitrary, and may be varied to suit special requirements of purpose and use.

Figure 3:
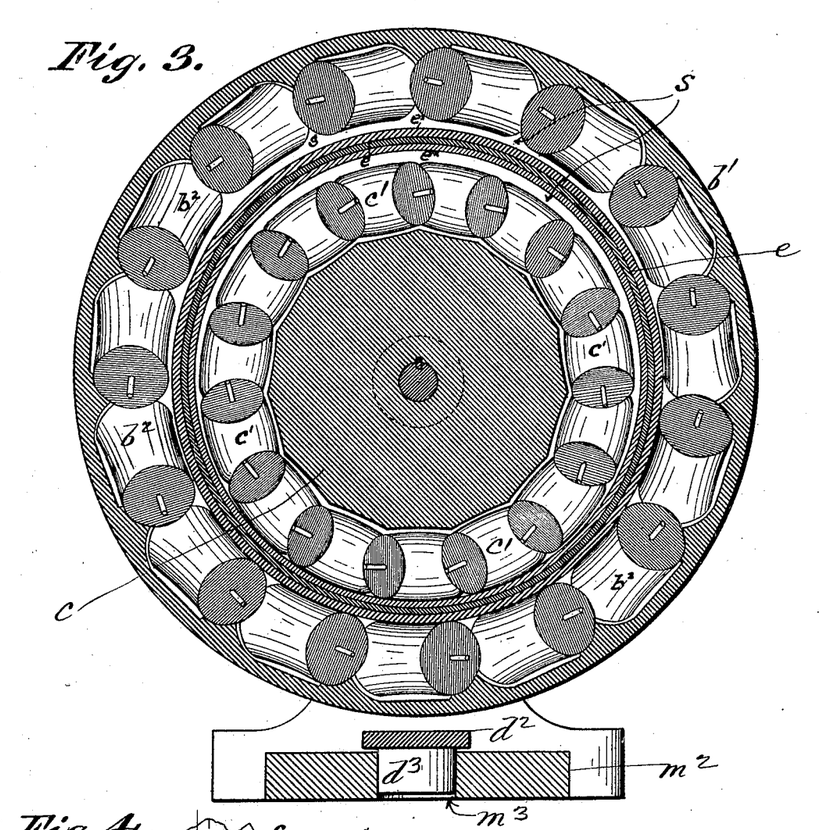
Fig. 3, is a transverse vertical section taken upon plane of line 3—3, Figs. 1 and 2.
Figures 4, 5:
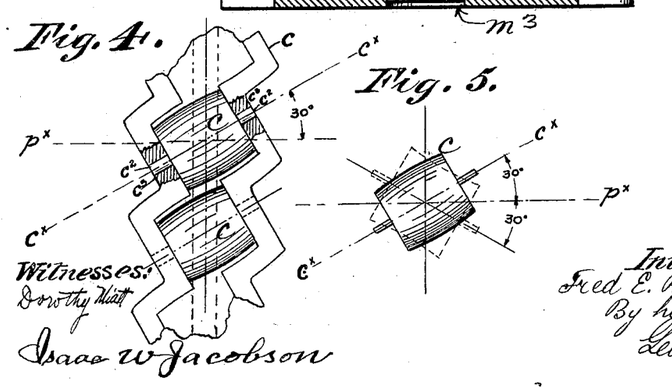
Fig. 4, is a detail showing a method of mounting the transmitting rollers in the apparatus shown in the preceding figures.
Fig. 5, is a diagram illustrating the relative arrangement of the two series of transmitting rollers used in the apparatus shown in the preceding figures.
Figure 6:
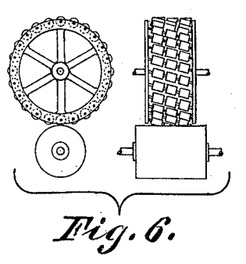
Fig. 6, is a diagrammatic representation of views taken at right angles to each other of a simple embodiment of my invention in which the transmitting rollers are mounted peripherally on a larger or main wheel and contact with a pinion.
Figure 7:
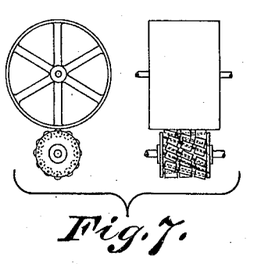
Fig. 7, shows diagrammatically views, taken at right angles to each other, of an arrangement of parts in which the transmitting rollers are mounted peripherally on a pinion and are in contactual engagement with a larger wheel.
Figure 8:
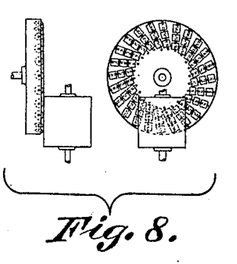
Fig. 8, shows diagrammatically views, taken at right angles to each other and illustrating an arrangement in which the transmitting rollers are mounted on the face of a disc wheel and contact with the peripheral surface of another wheel.
Figure 9:
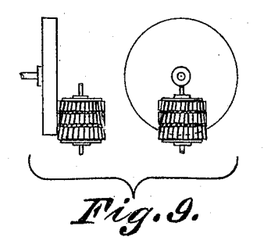
Fig. 9, shows diagrammatically the converse of the arrangement of parts illustrated in Fig. 8.
Figure 10:
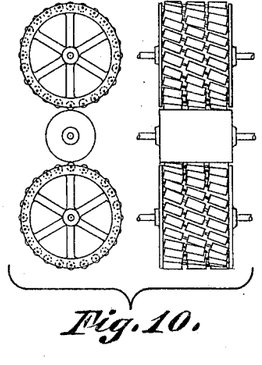
Fig. 10, is a diagrammatic representation of views, taken at right angles to each other, of an arrangement of parts in which an intermediate element is interposed between the driving and the driven elements.
Figure 11:
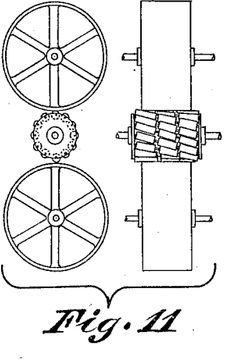
Fig. 11, shows similar views of an alternative arrangement in which the transmitting rollers are mounted on an intermediate element.
Figure 12:
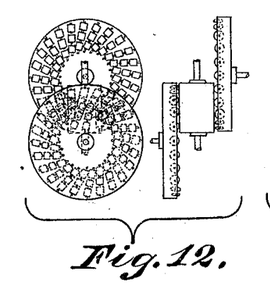
Fig. 12, shows diagrammatically views, taken at right angles to each other, of an arrangement of parts in which an intermediate member is positioned between opposed disc members on which the transmitting rollers are mounted.
Figure 13:
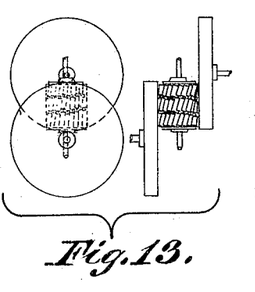
Fig. 13, shows the converse of the arrangement shown in Fig. 12, in that the transmitting rollers are mounted on the intermediate member.
Figure 14:
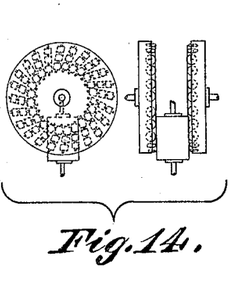
Fig. 14, shows a modification of the arrangement of parts shown in Fig. 12.
Figure 15:
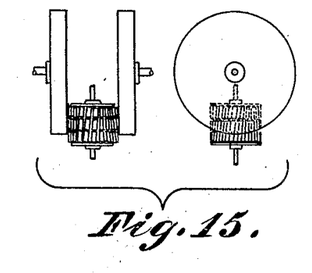
Fig. 15, shows the alternative of the arrangement shown in Fig. 14.
Figure 16:
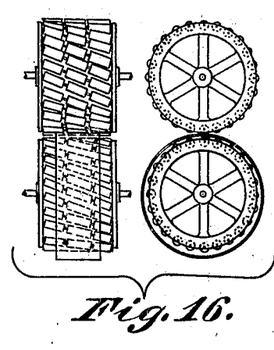
Fig. 16, shows diagrammatically views, taken at right angles to each other, in which the intermediate member is annular in form, and the transmitting rollers are mounted peripherally on both the other elements.
Figure 17:
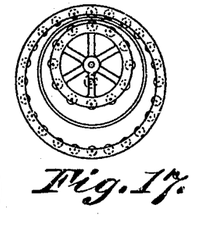
Fig. 17, shows a modification of the arrangement shown in Fig. 16.
Figure 18:
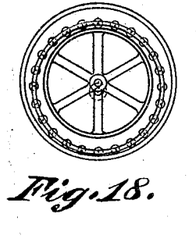
Fig. 18, shows a modification in which the transmitting rollers are mounted on an annular intermediate member.
Figure 19:
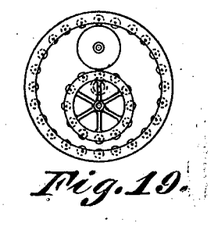
Figs. 19 and 20, show other modifications in the mounting of the transmitting rollers and their relation to the other elements of the device.
Figure 20:
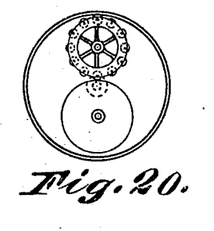
Figure 21:
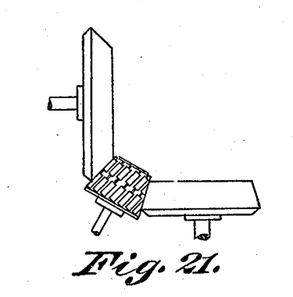
Figs. 21 and 22, illustrate the application of the principle of my invention to bevelled wheels.
Figure 22:
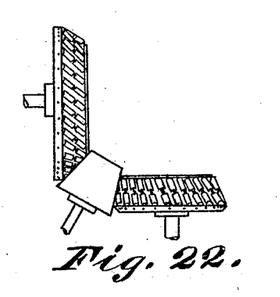

The pulley or equivalent wheel $b$, is formed with a lateral annular flange extension $b'$, on and in which a series of rollers $b^2$, are mounted, with their axes inclined in the opposite direction to those of the aforesaid pitch rollers $c'$, on the wheel $c$, and at an equal or approximately equal angle of divergence from the axis of the wheel $b$, and the longitudinal axis $p^x$, of the power shaft $p$, as illustrated diagrammaticaly in Fig. 5. We thus have a series of centripetally arranged rollers $b^2$, on the wheel $b$, opposed to the peripherally arranged series of rollers $c'$, on the power shaft wheel, $c$, and these opposed annular series of rollers are eccentric as related to each other because the wheel $b$, is mounted eccentrically as related to the power shaft. That is to say the wheel $b$, is rotatably mounted upon a cylindrical hub extension $m^x$, of the bearing $m$, but the axial center of this cylindrical hub extension $m^x$, is above the longitudinal axes of the power shaft $p$. As a result of this eccentricity of mount I attain a crescentic space $s$, between the annular series of peripheral rollers $c'$, on the wheel $c$, and the annular series of centripetal rollers $b^2$, on the wheel $b$, as illustrated particularly in Fig. 3, by which it will be seen that in this arrangement the narrowest part of said crescentic space $s$, is below the centers of said wheels $c$, $b$.

In this crescentic space $s$, I position a rotatable annular intermediatory element $e$, the axis of which is normally in horizontal alignment with the axes of the wheels $c$, $b$, but between them. As shown in the accompanying drawings this intermediatory element $e$, consists of the rim of a spider or dish shaped wheel $e'$, the hub $e^2$, of which is rotatably mounted on a journal $d$, provided on the upper extremity of a horizontally adjustable arm $d'$, which is pivotally mounted on the bed $m^2$, of the frame. That is to say the base $d^2$, of the arm or standard $d'$, rests on the bed $m^2$, of the frame, and is formed with a trunnion $d^3$, which fits in a socket $m^3$, formed for it in said bed $m^3$,—the vertical axis of said socket $m^3$, and trunnion $d^3$, being coincident with the vertical center of the intermediatory annular element $e$, and hence in line with a vertical plane projected through the common transverse center of the two series of rollers $c'$, $b^2$, as will be understood by reference more particularly to Figs. 1 and 2, in which the section plane lines 3—3, correspond to the plane last referred to.

As hereinbefore intimated the axis of the wheel $e'$, vertically considered, is between the axes of the wheels $c$, $b$, and it may be shifted out of horizontal parallelism or alignment therewith, and held at a prescribed angle with relation thereto. To this end I form a segmental rack $m^4$, on the bed $m^2$, concentric with the trunnion socket $m^3$, and provide the base $d^2$, of the standard or arm $d'$, with a spring detent lever $d^4$, adapted to engage with the notches or teeth in said segmental rack $m^4$. By this means the axis of the intermediatory wheel $e$, may be set horizontally several degrees on one side or the other of the longitudinal axis $p^x$, of the power shaft shaft $p$, and the axis of the wheel $b$.

Figure 2:
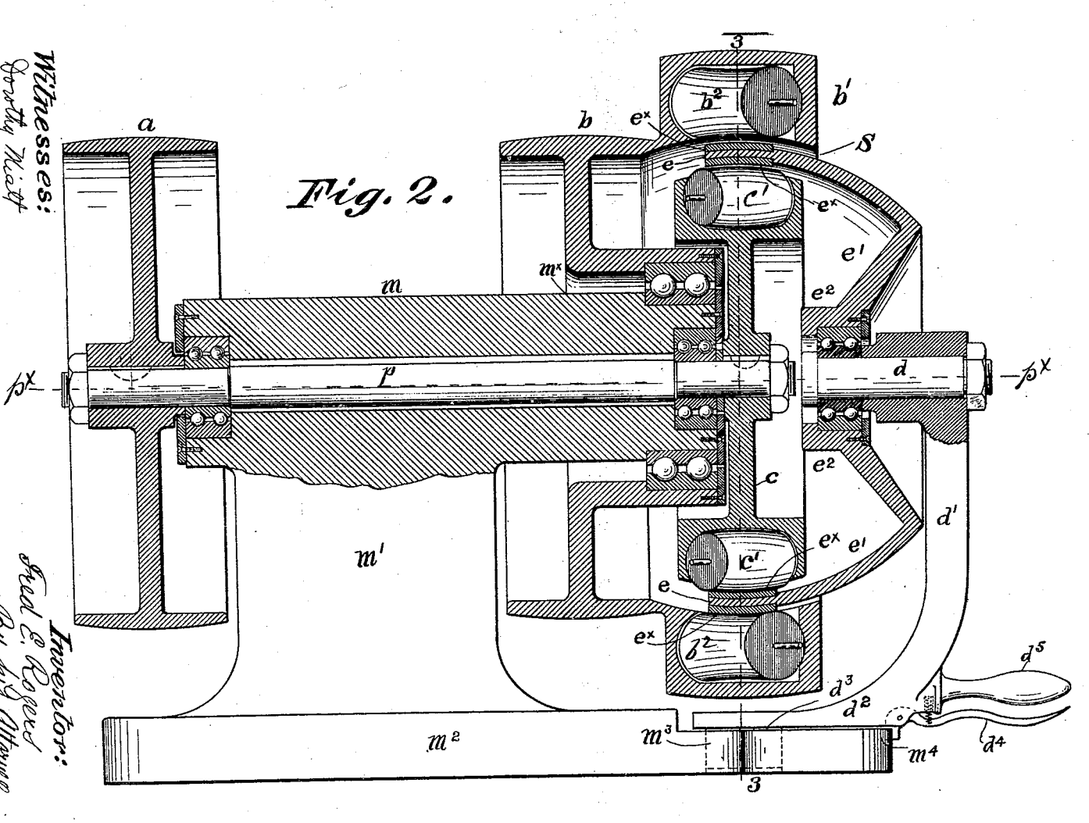
Fig. 2, is a central longitudinal sectional elevation taken upon plane of line 2—2, Fig. 1.

Both faces (inner and outer) of the intermediatory annular element $e$, are preferably provided with contactual surfaces $e^x$, of relatively high frictional co-efficiency,—being covered with leather or other suitable material, as may be found most expedient in effecting a suitable frictional grip on the rollers; and the thickness of said annular intermediatory element $e$, is equal to the lesser width of the crescentic space $s$,—i. e., the lower area thereof in the arrangement of parts shown in the first three figures of the drawings, particularly Figs. 2 and 3, by reference to which it will be seen that said intermediatory element $e$, in this area is in contactual engagement with adjacent members of both sets of rollers $c'$, $b^2$,—is in fact pinched between them. Fig. 2, shows the intermediatory element $e$, as of concavo-convex form in cross section, the peripheral rollers $c'$, being peripherally convex, and the centripetal rollers $b^2$, peripherally concave, so as to conform to and fit the said annular intermediatory element $e$, when contacting therewith.

Figures 23, 24, 25, 26, 27, 28:
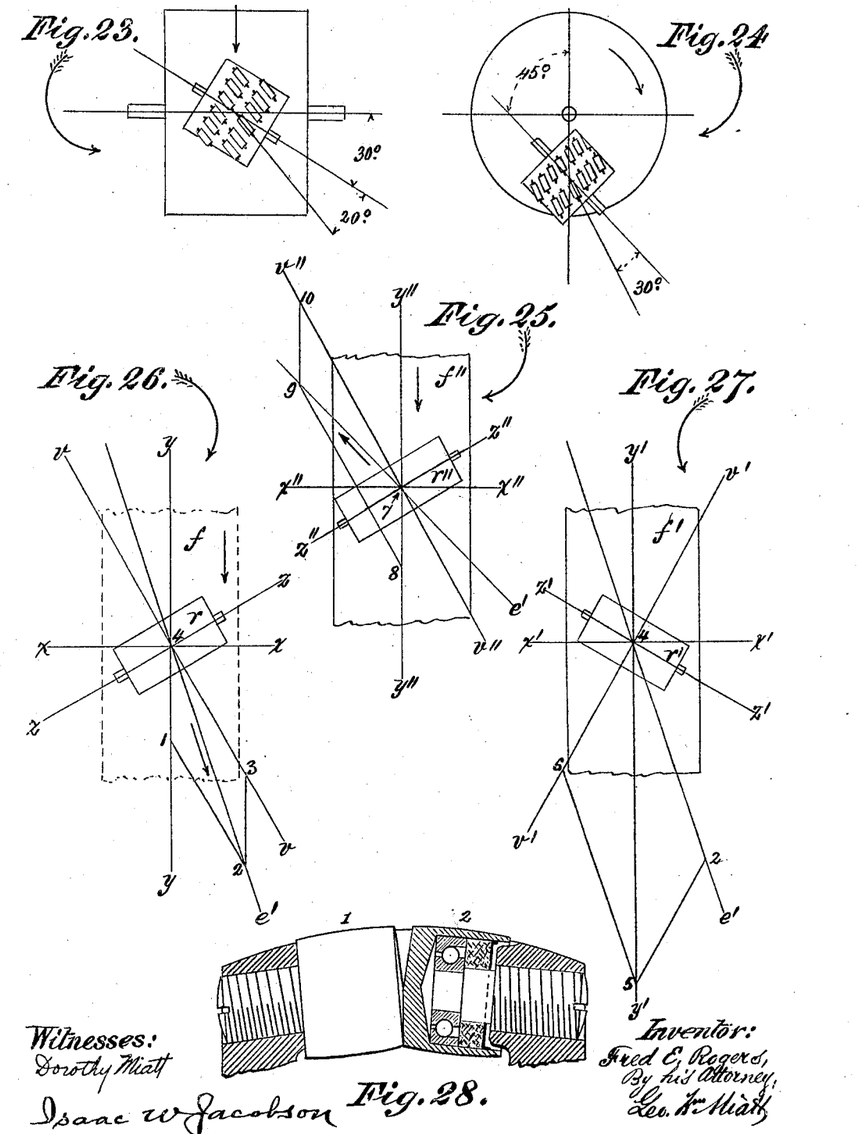
Figs. 23, 24 and 25, are diagrams illustrating how reversal of motion may be effected by means of the transmitting rollers.
Figs. 26 and 27, are co-related diagrams illustrating the principle of action involved in my use of helical rollers as a means of effecting variable speed transmission.
Fig. 28, is a sectional detail showing a modification in the construction of the helical rollers in which a compound roller is substituted for the form of rollers shown in other figures of the drawings.

A similar or even better result may be attained by the use of the modified form of roller shown in Fig. 28, in which each roller, considered as a whole, is made in two contiguous sections. That is to say instead of using one simple roller as shown in Figs. 2 and 3, for each roller element I provide a duplex roller made of two parts, (1 and 2) abutting at their inner ends, and mounted on studs whose axes are inclined outward from the shaft axes a few degrees. The rollers are provided with ball bearings, and the supporting studs are screwed in tapped holes in the sides of the wheels. In this manner I provide a form of roller that conforms to a slightly concave or convex surface without departing widely from an essentially cylindrical form. Thus the utmost freedom of movement is secured, and waste effort and frictional resistance is reduced to a minimum.

In this connection it may be stated that, as shown in Fig. 2, I prefer to use ball bearings in the mounts for the power shaft $p$, and wheels $b$, and $e'$, for the purpose of producing a light running anti-friction apparatus which will transmit power with a minimum of loss from resistance.

The speed changing characteristic of my machine is based on the theory of force resolution. A force acting in any direction may be resolved into two or more components whose intensity and direction will depend on the means employed to effect the resolution. In the machine shown in Figs. 1, 2, 3, 4 and 5, the means employed are two wheels mounted with their axes parallel and near together, rollers mounted on the opposed outer and inner faces of these wheels, and an intermediate member, essentially a ring, secured to a cup shaped wheel and mounted on a bearing which is capable of angular adjustment as related to the axes of the driving and driven wheels. The roller axes, being inclined to the wheel axes, transmit the movement of the driving wheel to the intermediate ring member in a ratio depending on the angular adjustment of the latter. This is shown diagrammatically in Fig. 26. Thus, in this diagram let $f$, represent the driving wheel, $r$, a roller element and $e'$, the belt or ring member. The axis of $f$, is represented by $x$—$x$, and the axis of the roller by $z$—$z$, while the direction of motion of $f$, is shown by $y$—$y$. Then the motion imparted to $e'$, is found by drawing from any point on $y$—$y$, the line 1—2 parallel to $v$—$v$, which is at right angles to $z$—$z$, and intersecting $e'$, at 2. The line 2—3 is drawn from 2 parallel to $y$—$y$, and intersects $v$—$v$ at 3. Thus we have formed a parallelogram of forces in which 4—1 represents the direction and length of driving wheel movement, while 4—2 represents the direction and length of movement transmitted to $e'$. It is evident that the resultant 4—2 will depend on the angle at which the ring or belt $e'$, is constrained to move. Hence we control the velocity ratio by shifting the angular position of $e'$, as it has been described. The motion imparted to $e'$, is in turn transmitted to the driven wheel through a corresponding roller element. If the roller element on the driving wheel was set at the same angle as in the driven wheel it is evident the reverse action would take effect and change in velocity ratio would be neutralized. But I set the rollers in the driven wheel at the opposite angle of inclination and thus increase the effect produced in the first transformation. Thus in Fig. 27, 4—2 represents the direction and length of movement of $e'$, taken from Fig. 26. Now to find the direction and amount of movement imparted to $f'$, draw 2—5 parallel to $v'$—$v'$, from 2 and intersecting $y'$—$y'$, at 5. Draw 5—6 parallel to the path $e'$ intersecting $v'$—$v'$, at 6. Then we have a parallelogram 4—2—5—6 in which 4—5 is the resultant motion that is imparted to $f'$.

Figure 1:
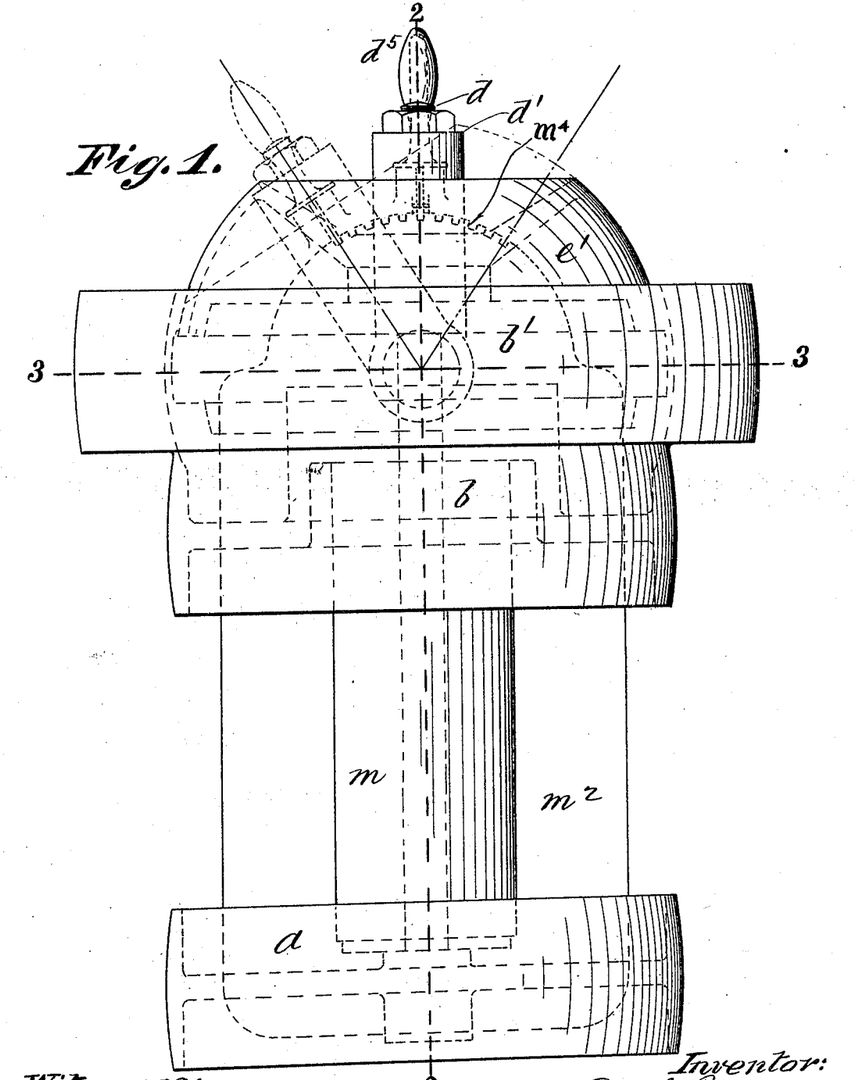
Fig. 1, is a top view of one form of apparatus embodying the essential features of my invention.

When the horizontal axis of the intermediatory wheel $e'$, is in parallelism with the axes of the wheels $b$, and $c$, and power shaft,—i. e., when all the axes are in alignment in the same vertical longitudinal plane, as in Figs. 1, 2 and 3, the element $e$, will be in medial or neutral position, and said element $e$, will then transmit the power from one wheel to the other at nearly the same velocity ratio. If now the said intermediatory element $e$, be turned even slightly on its vertical axis, (coincident with the line 3—3, Fig. 2) by means of the handle $d^5$, it is obvious that its relation to the axial inclination of both sets of rollers $b^2$, $c'$, will be changed, and that the speed of transmission will be changed as and for the reasons hereinbefore set forth. Furthermore, if the element $e$, be shifted on its vertical axis through an angle greater than the angle of inclination of the rollers on either of the wheels $c$, or $b$, the direction of the motion will be reversed.

Thus if the path of the friction ring $e'$, is inclined to an angle greater than the angle made by $v''-v''$, Fig. 25, to the roller axis then reverse action takes place. That is, when wheel $f''$, drives in the direction of the arrow, $e'$, is driven contrawise in the direction indicated by the arrow alongside.

The graphic analysis of forces acting is developed in the same manner as just described. Any distance 7—8 is laid off on $y''-y''$, and 8—9 is drawn parallel to $v''-v''$. The parallelogram is completed by drawing 9—10 parallel to $y''-y''$. The resultant 7—9 shows the direction and extent of movement imparted to $e'$ by the movement 7—8 of the wheel $f''$.

The above description of reversibility applies of course to the arrangement of parts illustrated in the first five figures of the accompanying drawings. The same result may be attained without the intermediatory member $e$, where the rollers are mounted upon one or the other of two wheels, a driver and a driven, as in Figs. 23 and 24. In the case shown in Fig. 23, the rollers are shown inclined at an angle of say twenty degrees to the axis of the pinion on which they are mounted, and, if the pinion axis is shifted through an angle of say thirty degrees in the direction indicated reverse motion will be effected. In Fig. 24, the pinion axis is shown inclined forty-five degrees from the mean radius of the disc sector in engagement while the rollers are set at an inclination of thirty degrees with their pinion axis. Here also the movement is reversed.

This feature of reversibility is a most valuable characteristic of my speed changing means, especially when applied to automobiles and analogous motor driven mechanism, since by means thereof the same lever may be used for either change of speed or reversal of motion.

Having thus illustrated and described an embodiment of my invention, in practicable apparatus for varying the speed of transmission, of power and reversal of direction of motion, I now desire to call attention to various modifications that may be resorted to in the application of the essential principle involved,—i. e., the interposition between a driving and driven element of axially inclined rollers, and means for varying and regulating the contactual inclination thereof with either the driving or driven element, or both.

Thus in Figs. 6 to 9 inclusive, my rollers are shown as mounted directly on one or the other of these elements, while in Figs. 10 to 22, inclusive, an intermediate element is included in the combination. In all these examples a change of axial inclination of any one of the elements means a change in contactual pitch and a consequent change in speed of transmission.

What I claim as my invention and desire to secure by Letters Patent is,

1. In speed changing mechanism of the character designated, a driving shaft and a driving element rigidly secured thereto, a driven shaft having its axis parallel to the axis of the said driving shaft and a driven element rigidly secured to said driven shaft, an interposed member with the surfaces of which said elements contact, rollers inclined to the shaft axes, mounted on one of said elements and transmitting motion to the other of said elements, and means for changing the axial inclination of said rollers with relation to the surface of which they contact to change the angle through which the resolution of force is effected, for the purpose set forth.

2. In speed changing mechanism of the character designated, a driving shaft and a driving element rigidly secured thereto, a driven shaft having its axis parallel to the axis of the said driving shaft and a driven element rigidly secured to said driven shaft, an interposed member with the surfaces of which said elements contact, rollers inclined to the shaft axes, mounted on one of said elements and transmitting motion to the other of said elements, and means for changing the axial inclination of said rollers with relation to their contactual engagement with one or both of said elements to change the angle through which the resolution of force is effected, for the purpose described.

3. In speed changing mechanism of the character designated, in combination, a driving shaft and a driving element rigidly secured thereto, a driven shaft having its axis parallel to the axis of said driving shaft and a driven element rigidly attached to said driven shaft, a transmitting element interposed between them, rollers interposed between said driving and driven elements and said intermediate transmitting element, and means for changing the axial inclination of said rollers as related to their peripheral engagement with the other parts, for the purpose described.

4. In speed changing mechanism of the character designated, in combination, a driving shaft and a driving element rigidly attached thereto, a driven shaft having its axis parallel to the axis of the said driving shaft and a driven element rigidly attached to said driven shaft, said shafts being eccentrically mounted as related to each other thereby forming a crescentic space between said driving and driven elements, an intermediate transmitting member mounted eccentrically with relation to the driving and driven elements and contacting with the said intermediate transmitting member, rollers interposed between said driving and driven elements, and means for shifting the latter to alter its contactual relation with the axes of said rollers, for the purpose described.

5. In speed changing mechanism of the character designated, in combination, a driving shaft and a driving element rigidly attached thereto, a driven shaft having its axis parallel to the axis of the said driving shaft and a driven element rigidly attached to said driven shaft, said shafts being eccentrically mounted as related to each other thereby forming a crescentic space between said driving and driven elements, an intermediate transmitting member mounted eccentrically with relation to the driving and driven elements and contacting with the said intermediate transmitting member, rollers interposed between said driving and driven elements, means for shifting the latter to alter its contactural relation with the axes of said rollers, and means for setting and holding it positively in prescribed positions, for the purpose described.

6. In speed changing mechanism of the character designated, in combination. a driving shaft and a driving element rigidly attached thereto, a driven shaft having its axis parallel to the axis of the said driving shaft and a driven element rigidly attached to said driven shaft, a transmitting element interposed between them, a plurality of axially inclined rollers mounted on the driving element and contacting with the intermediate transmitting element, a plurality of axially inclined rollers mounted on the driven element and contacting with said intermediate transmitting element, the axes of the rollers on the driving element being oppositely inclined as related to the axes of the rollers on the driven element, and means for shifting the intermediate element so as to alter its contactual relation with both of the opposed sets of rollers, for the purpose described.

FRED E. ROGERS.

Witnesses:
GEO. WM. MIATT,
DOROTHY MIATT.